(12) United States Patent
Murtha et al.

(10) Patent No.: US 8,598,740 B2
(45) Date of Patent: Dec. 3, 2013

(54) INTELLIGENT BATTERY SYSTEM

(71) Applicant: Anton/Bauer, Inc., Shelton, CT (US)

(72) Inventors: Joseph G. Murtha, Monroe, CT (US);
Mark Ross, Fairfield, CT (US); James Markland, Stratford, CT (US); Willam Frederick, Bridgeport, CT (US); Carl Hultman, Derby, CT (US); Michael Accardi, Fairfield, CT (US)

(73) Assignee: Anton/Bauer, Inc., Shelton, CT (US)

( * ) Notice: Subject to any disclaimer, the term of this patent is extended or adjusted under 35 U.S.C. 154(b) by 0 days.

(21) Appl. No.: 13/681,804

(22) Filed: Nov. 20, 2012

(65) Prior Publication Data

US 2013/0076137 A1    Mar. 28, 2013

Related U.S. Application Data

(63) Continuation of application No. 12/761,792, filed on Apr. 16, 2010, now Pat. No. 8,338,985.

(60) Provisional application No. 61/170,181, filed on Apr. 17, 2009.

(51) Int. Cl.
*H02J 1/00*        (2006.01)

(52) U.S. Cl.
USPC ............................................. 307/66

(58) Field of Classification Search
USPC ............................................. 307/66
See application file for complete search history.

(56) References Cited

U.S. PATENT DOCUMENTS

| | | | |
|---|---|---|---|
| 5,553,294 | A | 9/1996 | Nanno et al. |
| 5,557,738 | A | 9/1996 | Townsley et al. |
| 5,600,230 | A | 2/1997 | Dunstan |
| 5,739,596 | A | 4/1998 | Takizawa et al. |
| 6,057,055 | A | 5/2000 | Kumagawa |
| 6,373,226 | B1 | 4/2002 | Itou et al. |
| 2005/0116686 | A1 | 6/2005 | Odaohhara |
| 2006/0290321 | A1 | 12/2006 | Bhogal et al. |
| 2009/0261656 | A1 | 10/2009 | Coonan et al. |

*Primary Examiner* — Daniel Cavallari
(74) *Attorney, Agent, or Firm* — McCormick, Paulding & Huber LLP

(57) ABSTRACT

A mobile workstation includes a first battery bracket for releasable attachment of a main battery, a second battery bracket for releasable attachment of a backup battery and a power control circuit. The power control circuit includes a first input for receiving and monitoring power from the main battery, a second input for receiving and monitoring power from the backup battery, and a DC output. The power control circuit selectively routes a first flow of electricity from the main battery to the DC output when the first flow of electricity exceeds a predetermined value, and routes a second flow of electricity from the backup battery to the DC output when the first flow of electricity falls below the predetermined value.

10 Claims, 10 Drawing Sheets

INTELLIGENT BATTERY SYSTEM

CROSS REFERENCE TO RELATED APPLICATIONS

This application is a continuation and claims the benefit of U.S. Utility application Ser. No. 12/761,792 filed on Apr. 16, 2010, which itself claims the benefit of U.S. Provisional Application Ser. No. 61/170,181, filed on Apr. 17, 2009, both of which are herein incorporated by reference in their entireties.

FIELD OF THE INVENTION

The present invention relates generally to battery systems and, more particularly, to an intelligent battery system for powering mobile workstations.

BACKGROUND OF THE INVENTION

Mobile computer workstations are desirable in numerous settings to make computer use more convenient and to make computers more accessible. For example, mobile workstations in the form of mobile medical carts are used in hospitals so that nurses and technicians may continually update patient information and treatment information from a variety of locations. In the hospital setting, for example, mobile workstations or mobile medical carts allow nurses to input changes in patient treatment or otherwise dispense patient care throughout the hospital environment while they are making their rounds.

Powering such mobile workstations, however, has proven troublesome. As will be readily appreciated, it is undesirable to plug such workstations into a standard wall outlet, as power will be interrupted when moving from room to room or patient to patient. Battery powered systems have attempted to solve this problem, however, even known battery powered systems have objectionable shortcomings. For example, known battery-powered workstations provide a fixed battery system, mounted underneath the cart/workstation, having a single cell chemistry battery and charging technology. Such systems use a single battery and a "bucket" concept to swap out the single battery. These known batteries for powering mobile workstations, however, are difficult to replace when spent. Moreover, existing systems make it is necessary to interrupt power to the cart when changing such batteries, therefore interrupting work flow and potentially resulting in the loss of data.

In view of the problems associated with known mobile workstations and systems for powering mobile workstations, there is a need for an improved battery system and, more particularly, for an intelligent battery system for powering mobile workstations wherein batteries may be swapped out without interrupting power to the workstation.

SUMMARY OF THE INVENTION

In view of the foregoing, it is an object of the present invention to provide an intelligent battery system.

It is another object of the present invention to provide an intelligent battery system for powering mobile workstations.

It is another object of the present invention to provide an intelligent battery system for powering mobile workstations wherein spent batteries may be swapped out without interrupting power to the workstation.

It is another object of the present invention to provide an intelligent battery system for powering mobile workstations that prevents batteries from being accidentally removed from the workstation.

It is another object of the present invention to provide an intelligent battery system that is capable of maintaining power even if the main batteries are spent or accidentally removed from the workstation.

It is another object of the present invention to provide an intelligent battery system that is capable of warning a user of the system of impending low battery capacity.

It is yet another object of the present invention to provide an intelligent battery system that is capable of running multiple batteries in parallel to simultaneously power the workstation.

It is another object of the present invention to provide an intelligent battery system that is capable of determining and displaying percent capacity and/or remaining run time of a battery or batteries.

It is another object of the present invention to provide an intelligent battery system that regulates voltage output to the mobile workstation.

It is another object of the present invention to provide an intelligent battery system and battery charger that can accommodate batteries with various cell chemistries.

It is another object of the present invention to provide an intelligent battery system that has low voltage shutdown capability.

It is another object of the present invention to provide an intelligent battery system and hot-swap device that can be retrofit on numerous existing medical cart applications.

It is therefore a general object of the present invention to provide an intelligent battery system for powering mobile workstations, wherein batteries may be swapped out without interrupting power to the workstation, comprising two snap-on battery interface brackets for accommodating two hot-swap batteries, a main hot-swap battery and a secondary hot-swap battery, and a third snap-on bracket to hold a spare battery. The battery system further comprises an integrated circuit and microprocessor to regulate voltage output and for providing battery parameter information such as percent capacity and/or remaining run time. The spare battery includes an integrated circuit for detecting the removal of either or both hot-swap batteries, for detecting when either or both hot-swap batteries are low in capacity and for providing backup power.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

The present invention is directed to an intelligent battery system 8 for powering mobile workstations.

Figure 1:
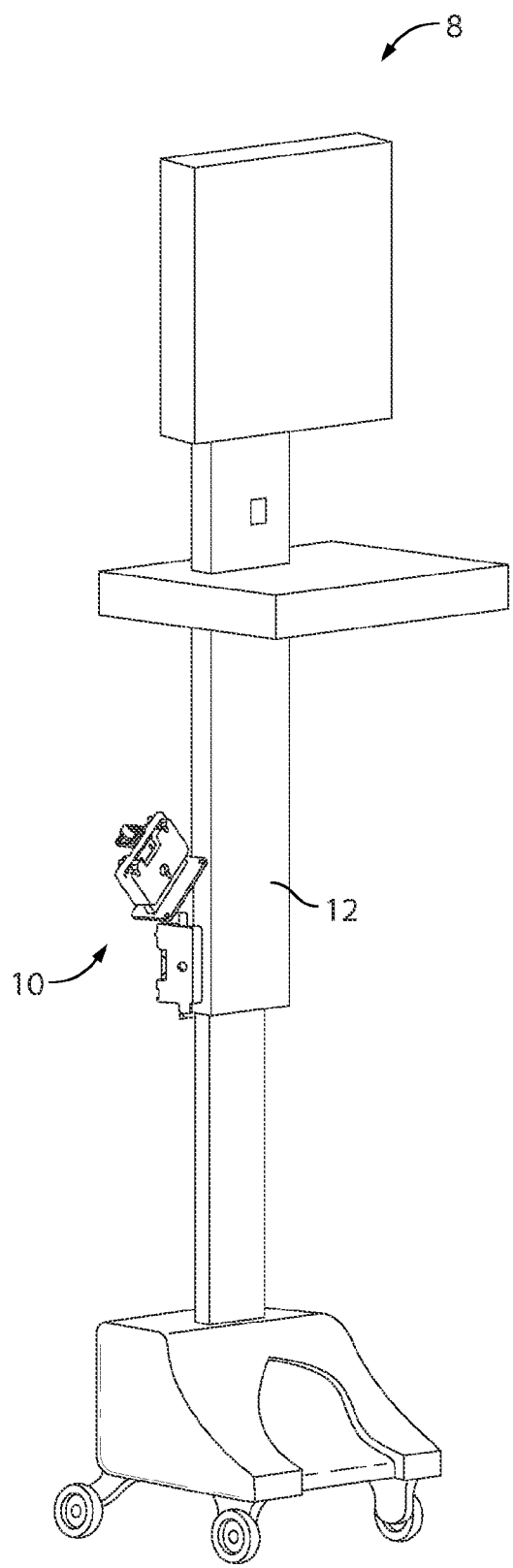
FIG. 1 is a perspective view of an intelligent battery system and hot-swap device mounted on a medical workstation in accordance with one embodiment of the present invention.

More particularly, and as shown in FIG. 1, the present invention is a multi-cell battery system that powers an in-hospital mobile medical cart workstation. The wireless workstation is typically utilized by nurses to dispense patient care throughout a hospital environment. Preferably the battery system may be used with NiMH, Li-Ion, NiCad, SLA and Li-Poly batteries, although batteries with any battery chemistry known in the art may be used with the present system.

Figure 2:
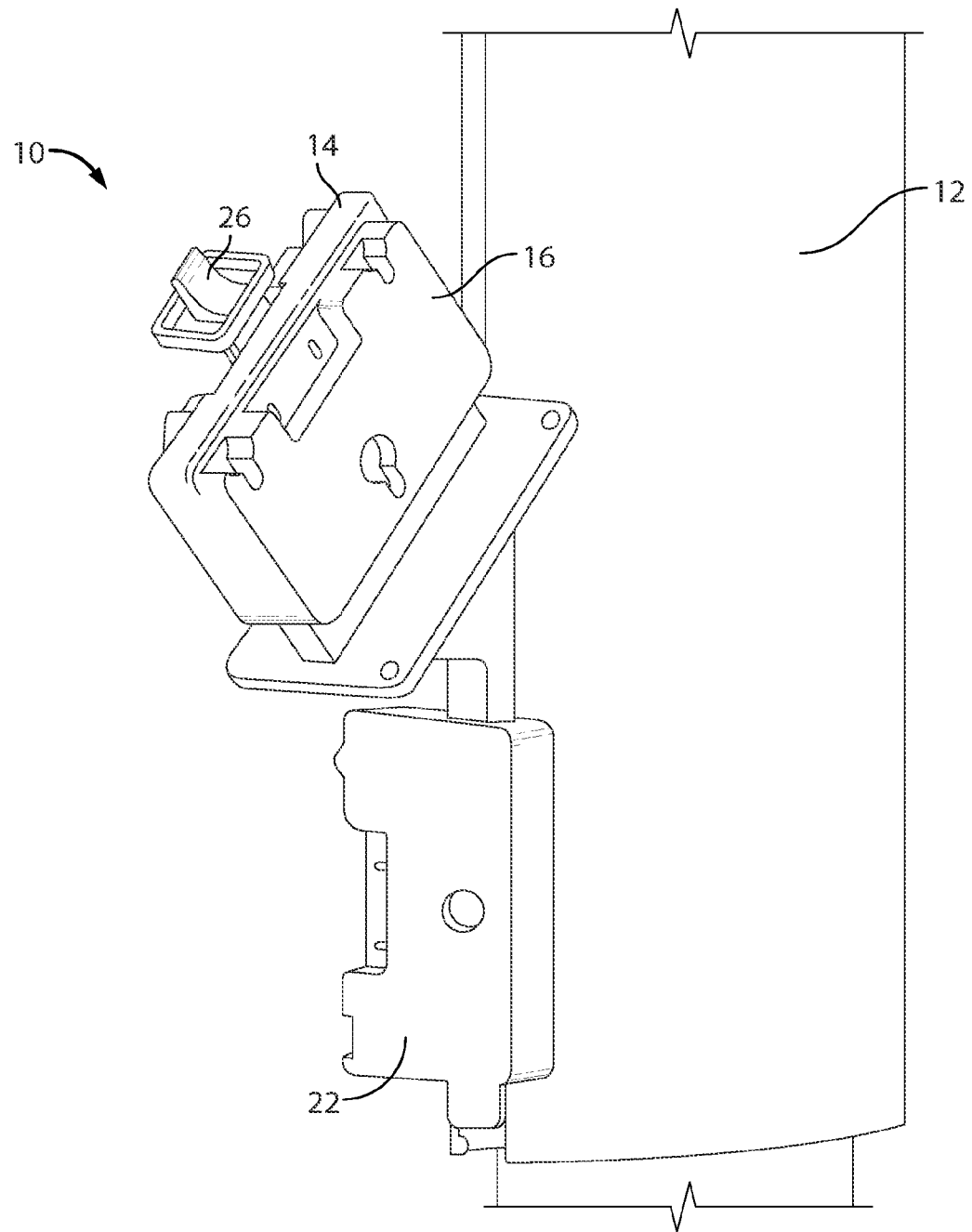
FIG. 2 is an enlarged perspective view of a hot-swap device without the batteries in accordance with one embodiment of the present invention.
Figure 3:
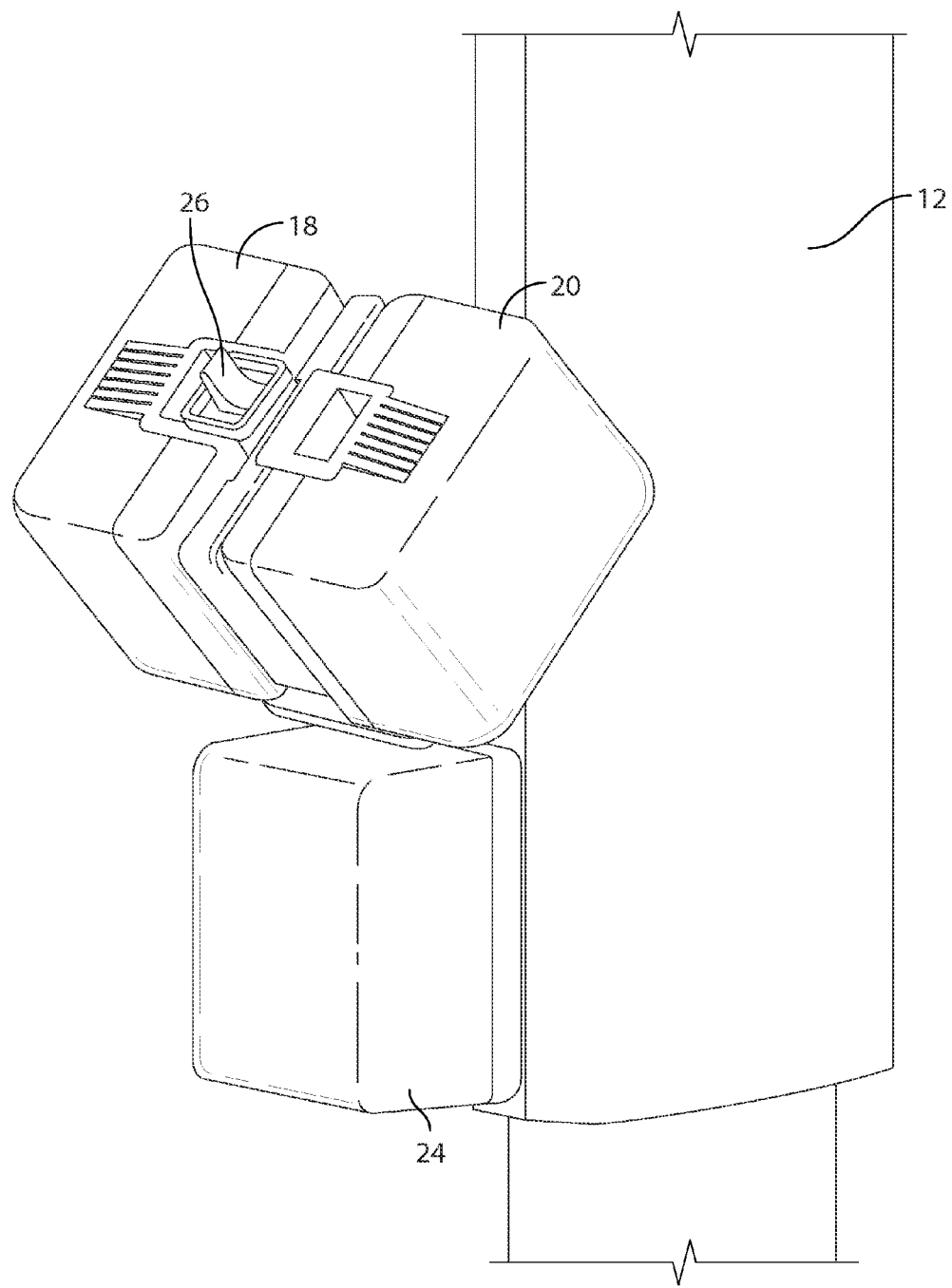
FIG. 3 is an enlarged perspective view of the hot-swap device of FIG. 2 with the batteries attached thereto in accordance with one embodiment of the present invention.
Figure 4:
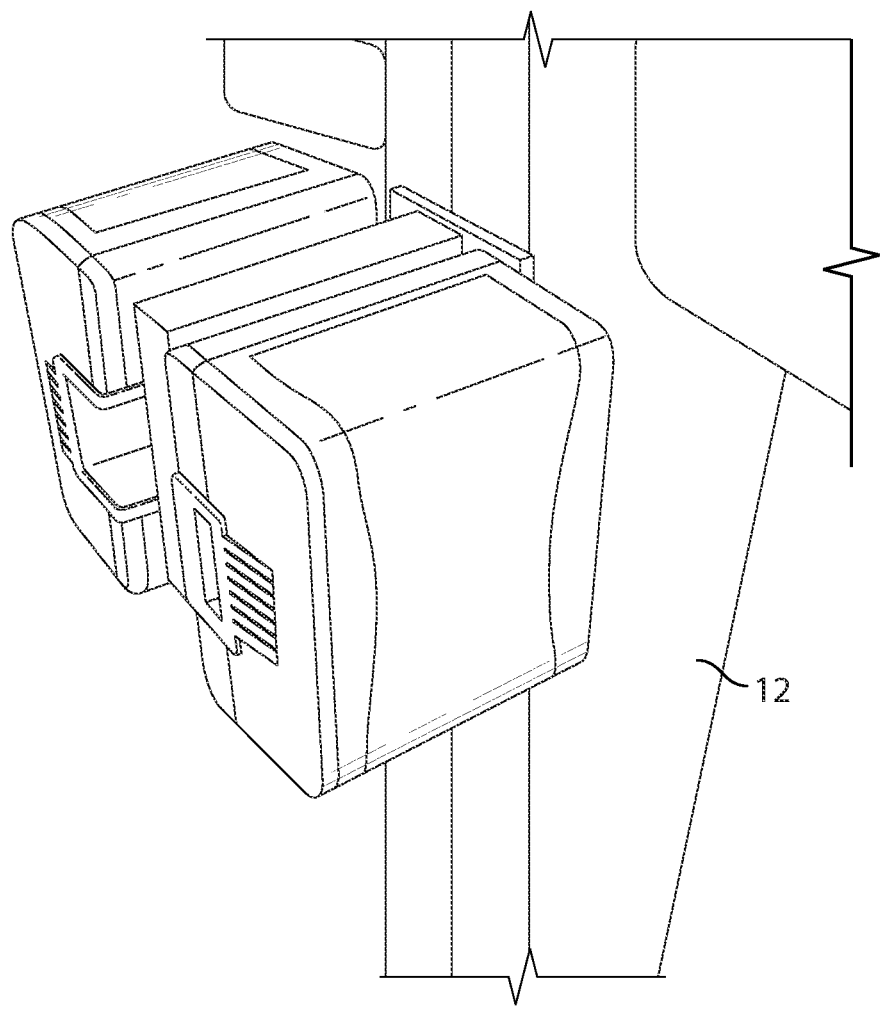
FIG. 4 is an enlarged perspective view of a hot-swap device with alternative batteries attached thereto in accordance with another embodiment of the present invention.
Figure 5:
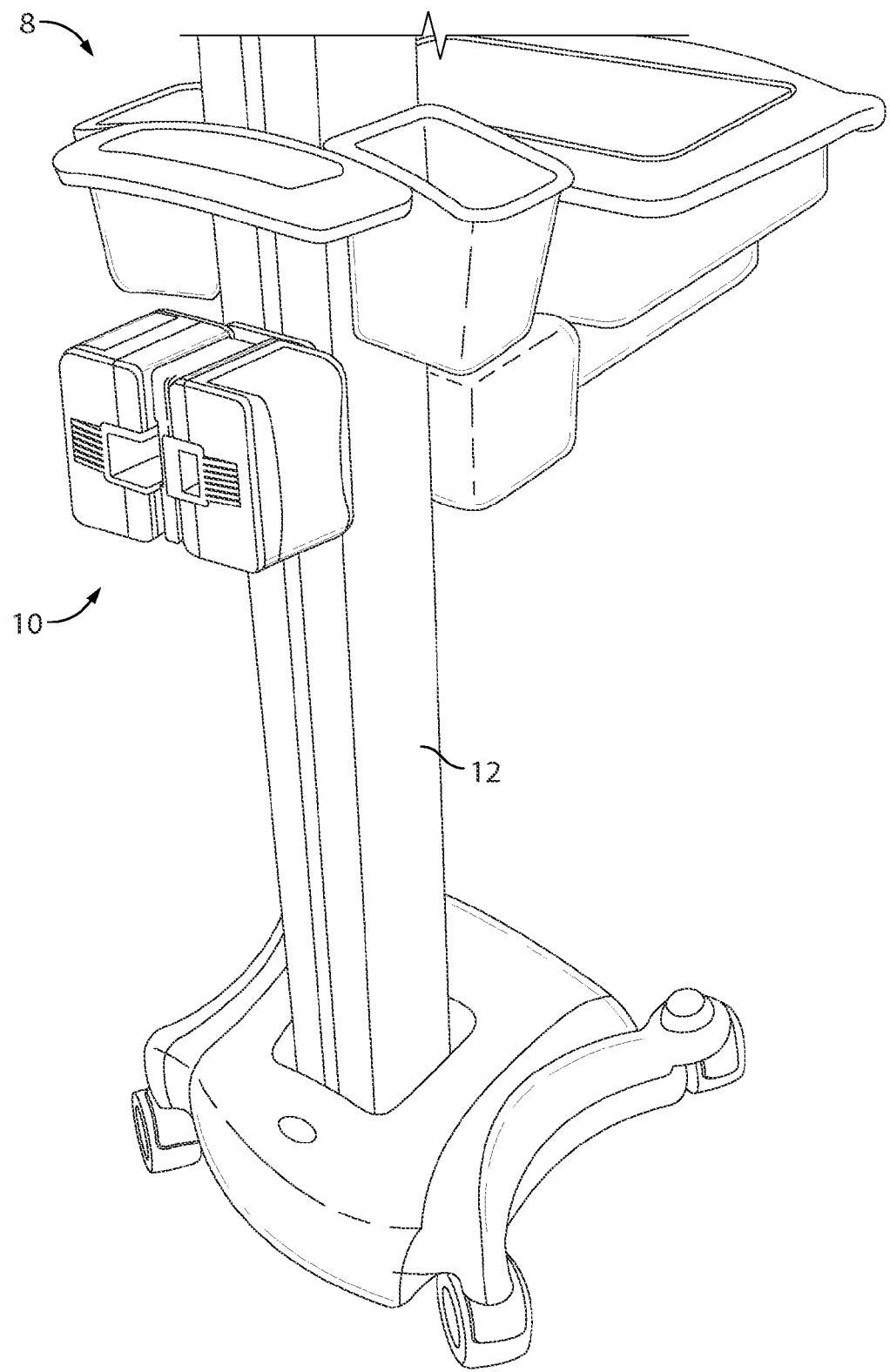
FIG. 5 is a perspective view of an intelligent battery system and the hot-swap device of FIG. 4 mounted on a medical workstation in accordance with another embodiment of the present invention.
Figure 6:
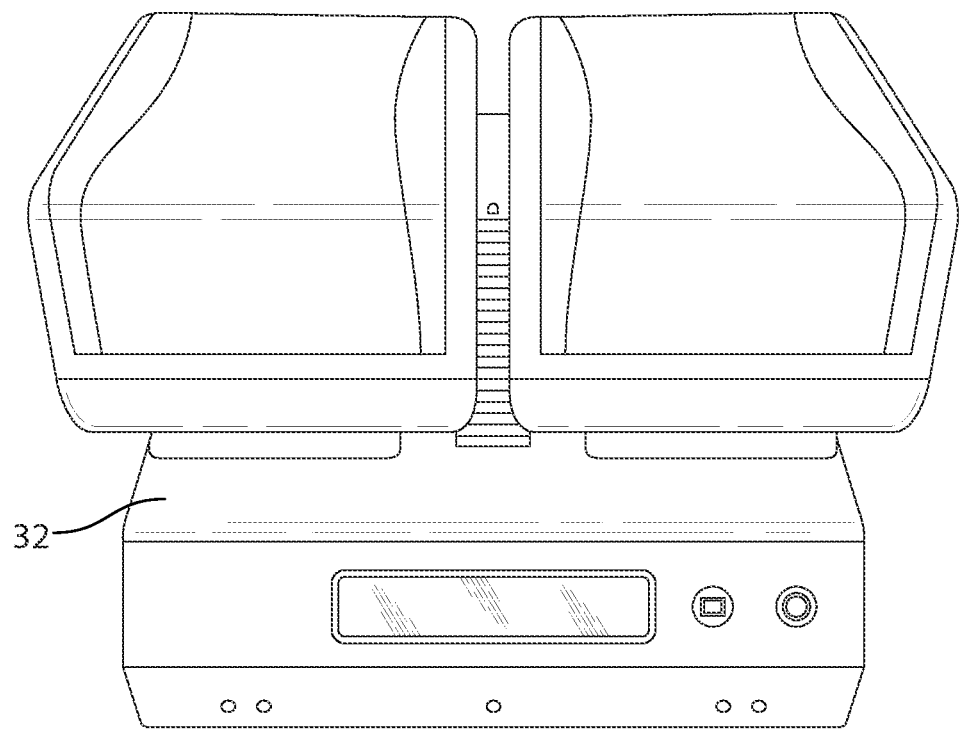
FIG. 6 is a perspective view of a charging station of an intelligent battery system showing the alternative batteries of FIG. 4 in accordance with one embodiment of the present invention.

As best shown in FIG. 2, the intelligent battery system of the present invention includes a "hot-swap" device 10 that is mounted to the side of a medical cart or other mobile workstation 12. As used herein, "hot-swap" refers to a system/device that allows a user to swap batteries in or out of the device without interrupting power to the workstation. The device 10 includes two snap-on battery interface brackets 14,16 for releasably attaching two hot-swap batteries, a main hot-swap battery 18 and a secondary hot-swap battery 20, and a third snap-on bracket 22 for releasably attaching a spare battery 24 in the event that one or both of the hot-swap batteries 18,20 are spent and need replacement. This configuration allows a user to perform a fresh battery change at the earliest convenience without interrupting power to the mobile workstation 12 and without having to immediately return to a designated battery charging station in some remote location.

The battery interface brackets 14,18,22 are preferably of the Anton/Bauer Gold Mount® type, although any type of bracket assembly may be used. The Gold Mount® bracket is substantially rectangular in shape and is formed with a plurality of keyholes cut in a front surface thereof, each keyhole having an elongated ovoid or elliptical opening and a narrow depending slot. The keyholes include two upper slots and a centrally located lower slot disposed in a substantially triangular array for releasably attaching each battery. Formed between the two upper keyholes is a connector block having a pair of banana plug terminals for placing each battery in electrical communication with the system. The connector block and its operation are described in detail in U.S. Pat. Nos. 6,247,962 and 4,822,296, which are hereby incorporated by reference.

In the preferred embodiment, the third snap-on spare battery bracket 22 is configured with an integrated circuit that enables the user to replace the spent hot-swap batteries 18,20 while the spare battery 24 and circuit automatically backs up the system. The spare battery circuitry is configured to detect the removal of either or both hot-swap batteries 18,20 from the snap-on interface brackets 14 and provide backup power during the exchange. The spare battery circuitry is also capable of detecting when either or both hot-swap batteries 18,20 are low in capacity and is configured to prompt the spare battery 24 to provide backup power when necessary.

The two hot-swap batteries 18,20 are also configured with an Analog Fuel Gauge in electrical communication with the spare battery circuitry. The Analog Fuel Gauge reading emanating from the two hot-swap batteries 18,20 is utilized by the spare battery circuitry to determine low battery pack capacity and/or when one of the two battery packs 18,20 are removed from the system. The spare battery circuitry further has the ability to provide an alert to warn of impending low spare battery capacity. Preferably, the alert will be a visual alert in the form of a LED indicator, although other alerts such as audio alerts may also be incorporated into the hot-swap device 10.

The snap-on battery interface brackets 14 may also include a locking device 26 to prevent accidental removal of both batteries simultaneously, thus interrupting power to the workstation 12.

In yet another embodiment of the present invention, the hot-swap bracket contains an integrated circuit that is capable of combining the outputs of batteries 18,20 together, thus allowing both hot-swap batteries 18,20 to be used in either parallel or series, to power the workstation simultaneously. Fresh batteries may be swapped in or out without interrupting power to the workstation 12.

Preferably, the device further contains a software adjustable voltage regulator circuit, including either a linear regulator or DC/DC converter, that provides a predetermined optimal voltage output depending upon the specific requirements of a particular workstation and associated equipment. In the preferred embodiment, the voltage regulator circuit provides a maximum required 15.5 Vdc. The regulator prevents over-voltage conditions due to hot-off-charge battery packs, i.e., battery packs that have just been charged and are at full charge. Without the regulator, hot-off-charge battery packs can reach upwards of 18 Vdc open circuit and create operational problems for certain pieces of workstation or medical cart equipment.

In another embodiment, the regulated output voltage can be adjusted to provide the voltage requirements for other workstations, medical carts, or other applications. Additionally, an inverter can be added to the device to provide 120/240 VAC for AC operated medical carts or workstations.

In the preferred embodiment, the device also contains a microprocessor control circuit that communicates with both hot-swap batteries 18,20 according to a particular protocol to monitor battery parameters. This communications protocol provides combined fuel gauging information in the form of percent capacity and/or remaining run time in hours and minutes for one or both batteries 18,20. The device also contains an interface with a remote fuel gauge indicator to display percent capacity and/or remaining run time in hours and minutes to a user of the system. Moreover, the software may be modified to report percent capacity and remaining run time to other remote fuel gauges, and can communicate with existing fuel gauge systems.

The battery system also includes a separate multi-station battery charger that can handle NiMH, Li-Ion, NiCad, SLA and Li-Poly, and other cell chemistries known in the art. In operation, a user can simply swap out the spent batteries at a designated charging station with fresh batteries from the multi-station charger. All batteries used with the present battery system contain smart battery fuel gauging circuitry that provides on-board LCD indicators of both percent capacity and remaining run time, i.e., real time information regarding battery capacity. Moreover, all batteries used with the present battery system contain a smart battery Analog Fuel Gauge (AFG) circuit that provides an on-board 0-5 Vdc representation of percent capacity.

The batteries used with the present intelligent battery system also contain competitor lock-out circuitry to prevent possible unsafe charging conditions resulting from differences in battery chemistries. Moreover, in the preferred embodiment, the batteries also contain over-current and thermal protection against end user abuse or workstation or medical cart equipment malfunction.

Preferably, the batteries and integrated circuits of the intelligent battery system provide a low voltage shutdown capability to prevent the over discharge of battery packs, thereby eliminating unrecoverable battery failure due to cell reversal. Indeed, if it is detected that battery capacity has reached a predetermined/set lower limit, the batter may be automatically shut down to avoid battery failure.

Figure 7:
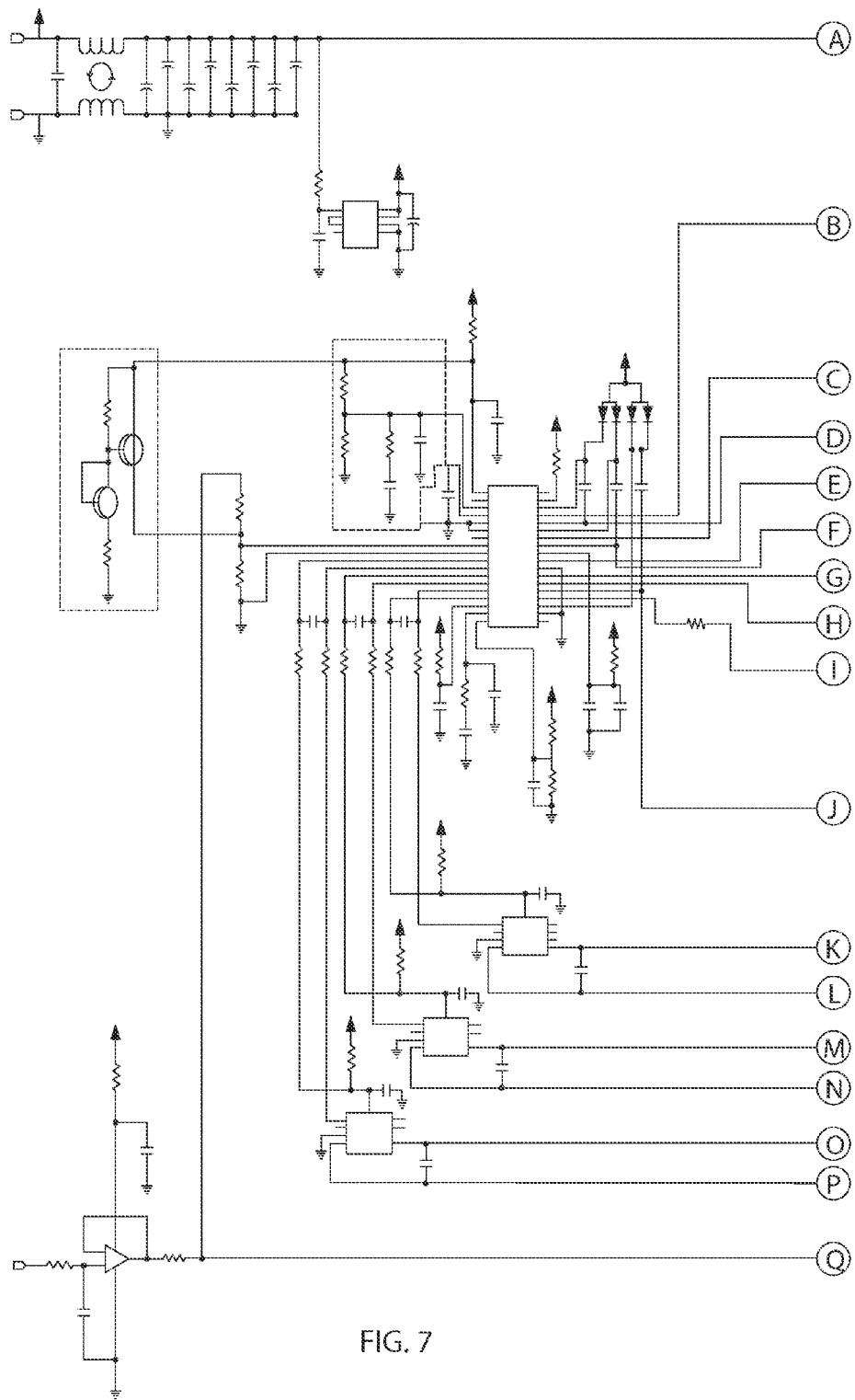
FIGS. 7 and 8 schematically illustrate an exemplary control circuit in accordance with one embodiment of the present invention.
Figure 7:
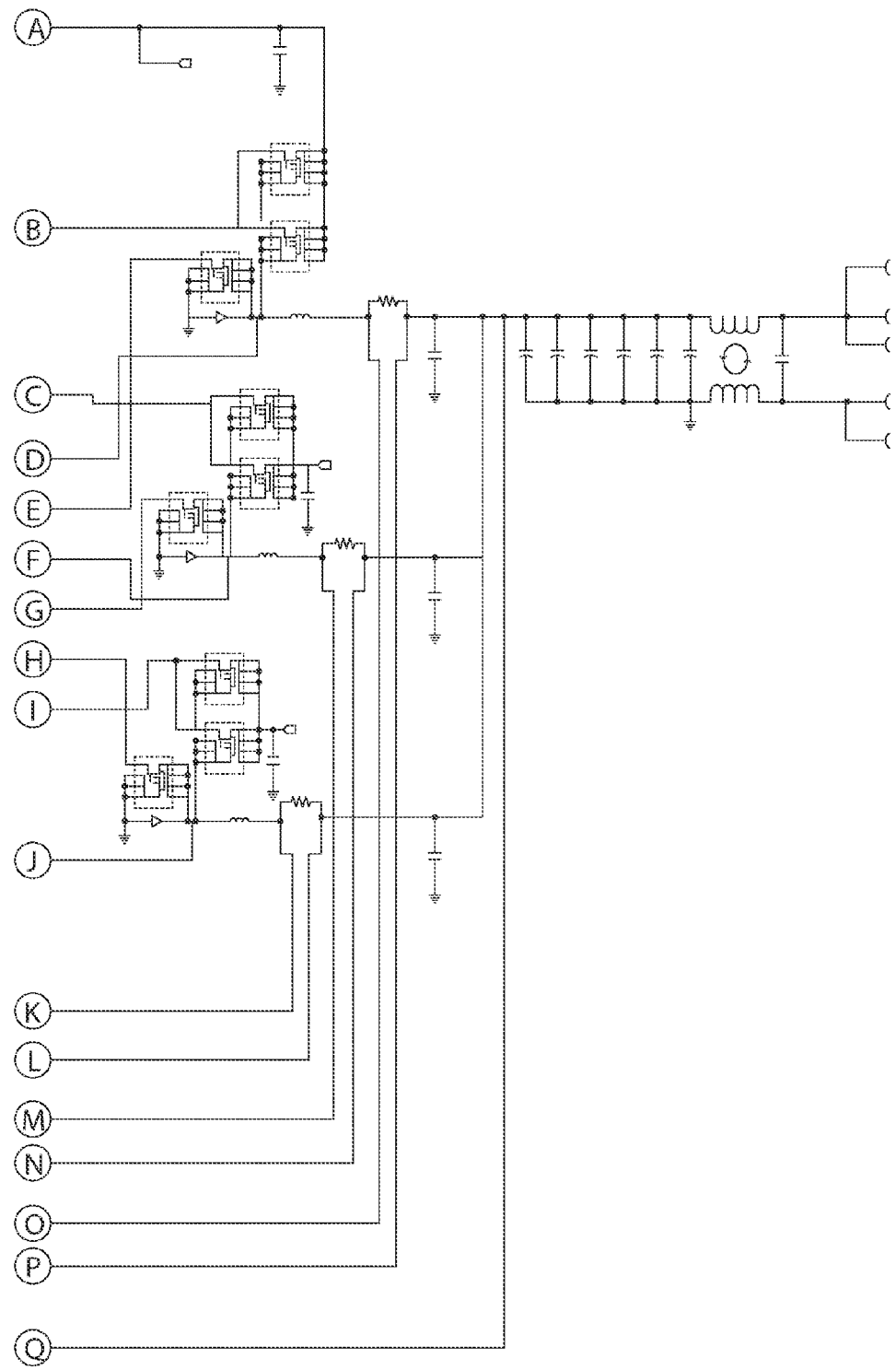
Figure 8:
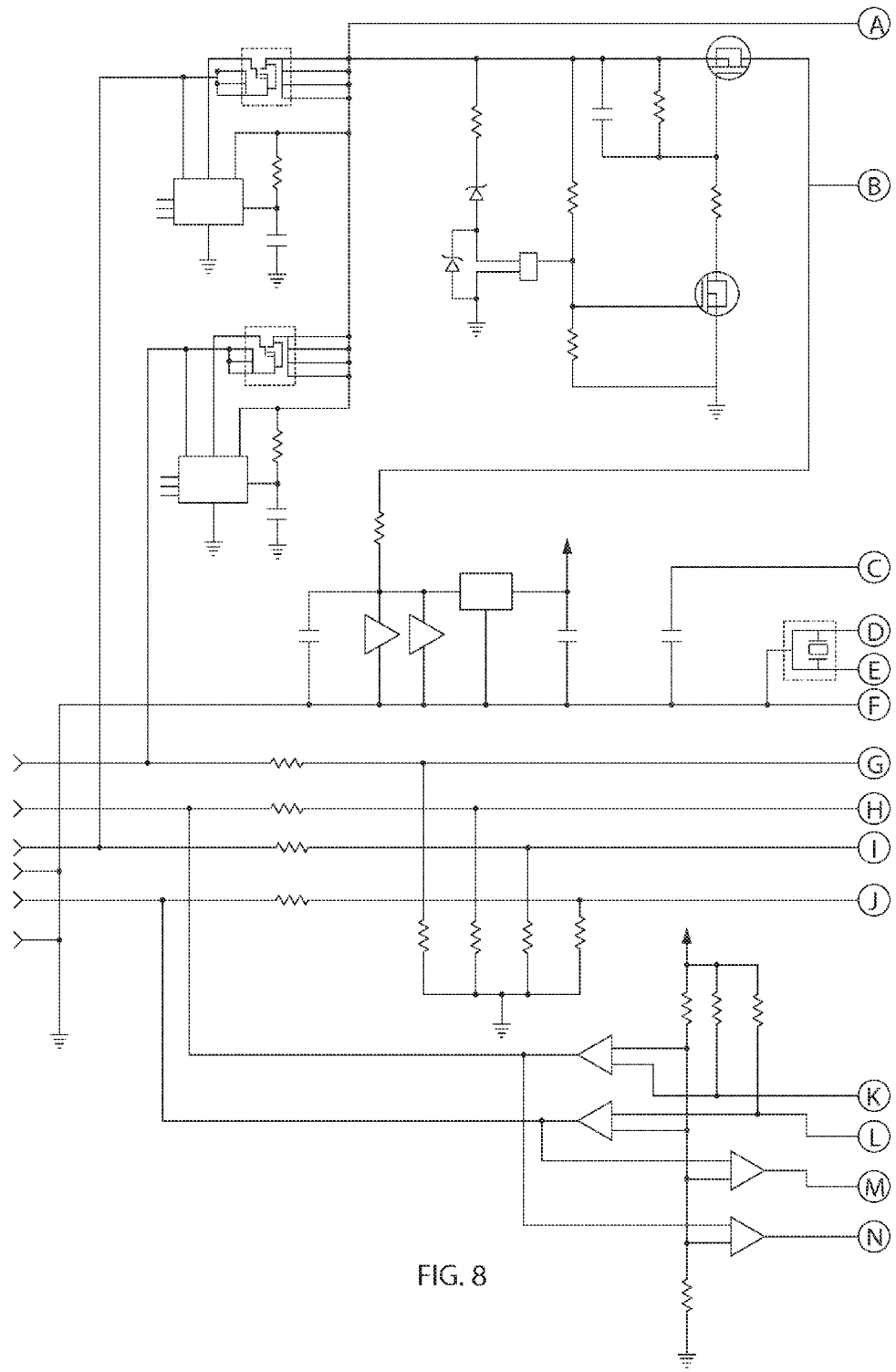
Figure 8:
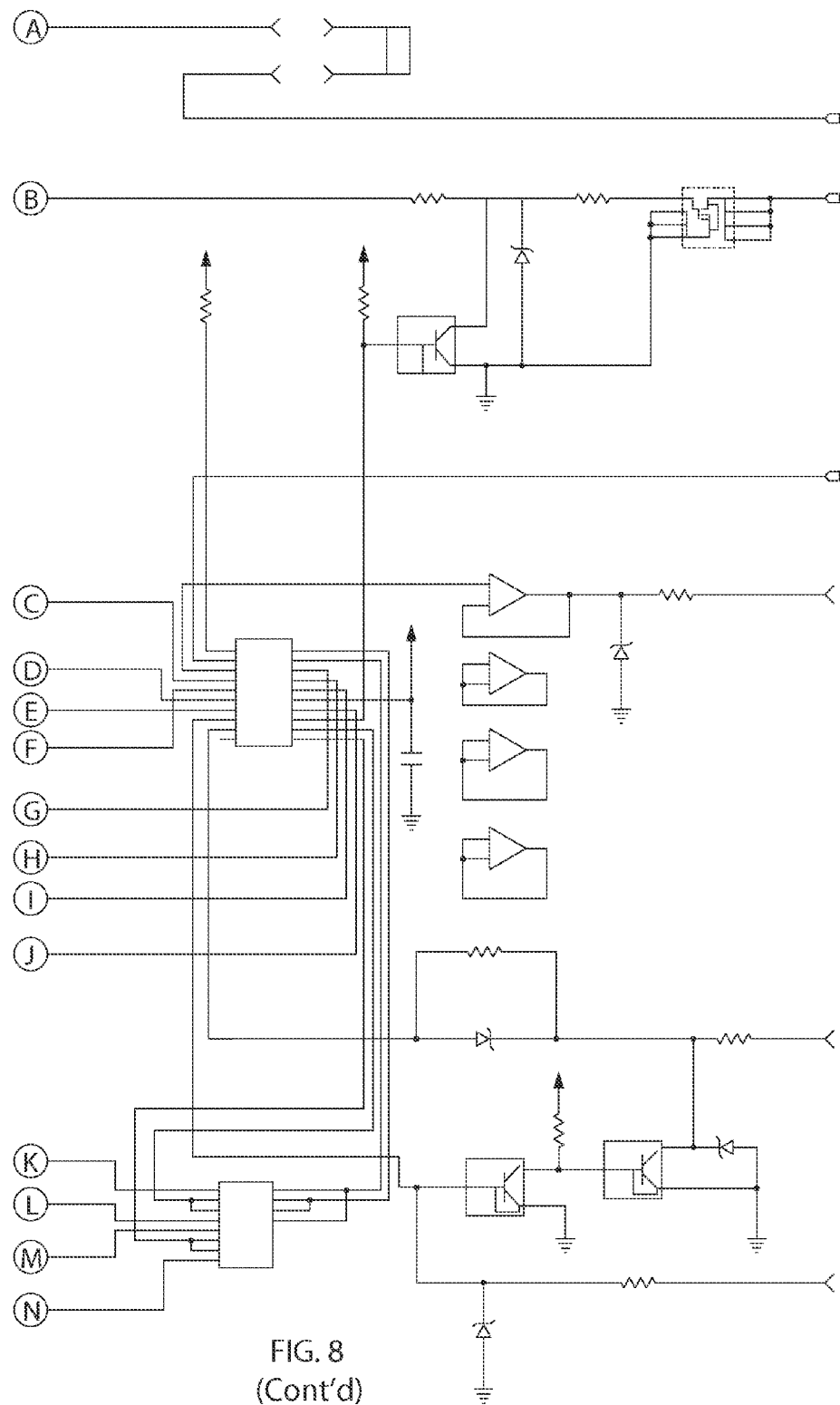

Turning now to FIGS. 7 and 8, an exemplary control circuit capable of carrying out the advantages and features of the present invention, as discussed above, is shown. As will be readily appreciated by those of ordinary skill in the art, alterations in the configuration of the circuitry shown in FIGS. 7 and 8 are certainly possible without departing from the broader aspects of the present invention.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A mobile workstation comprising:
a first battery bracket for releasable attachment of a main battery;
a second battery bracket for releasable attachment of a backup battery;
a power control circuit having a first input for receiving and monitoring power from said main battery, a second input for receiving and monitoring power from said backup battery, and a DC output, said power control circuit selectively routing a first flow of electricity from said main battery to said DC output when said first flow of electricity exceeds a predetermined value, and routing a second flow of electricity from said backup battery to said DC output when said first flow of electricity falls below said predetermined value; and
an inverter having a DC input connected to said DC output, an AC connector for providing AC power to electrical equipment associated with said workstation, and an AC/DC converter for converting power from said DC output to the AC electrical power provided at said AC connector.

2. The mobile workstation of claim 1, wherein:
said power control circuit determines, in real time, a first capacity of said main battery and a second capacity of said backup battery.

3. The mobile workstation of claim 2, wherein:
said power control circuit determines said first flow of electricity has fallen below said predetermined value when said main battery evidences a drop in said first capacity in excess of a predetermined parameter.

4. The mobile workstation of claim 1, wherein:
said power control circuit routing said first flow of electricity from said main battery to said DC output, and halting the routing of said second flow of electricity from said backup battery to said DC output, when said power control circuit detects that said first flow of electricity has risen above said predetermined value.

5. The mobile workstation of claim 1, further comprising:
a locking mechanism for preventing a simultaneous removal of said main battery and said backup battery.

6. The mobile workstation of claim 1, wherein:
said power control circuit selectively combines a power output of said main battery and said backup battery such that said main battery and said backup battery power said workstation in tandem.

7. The mobile workstation of claim 1, further comprising:
a voltage regulator circuit for detecting operating parameters of said workstation and for providing an optimal output voltage from said main battery and said backup battery in dependence thereon.

8. The mobile workstation of claim 7, wherein:
said at least one parameter is percent capacity remaining.

9. The mobile workstation of claim 8, wherein:
said at least one parameter is a remaining run time.

10. The mobile workstation of claim 1, wherein:
said power control circuit prevents over discharge of said main battery and said backup battery by shutting down one of said batteries if a capacity of either of said battery drops below said predetermined value.

* * * * *